United States Patent
Ganesh et al.

(10) Patent No.: US 9,436,620 B2
(45) Date of Patent: Sep. 6, 2016

(54) METHODOLOGY FOR DETECTING PROBLEMATIC CONNECTIONS WITH PERIPHERAL DEVICES

(71) Applicant: Google Inc., Mountain View, CA (US)

(72) Inventors: Jaikumar Ganesh, San Francisco, CA (US); Irfan Sheriff, Mountain View, CA (US)

(73) Assignee: Google Inc., Mountain View, CA (US)

( * ) Notice: Subject to any disclaimer, the term of this patent is extended or adjusted under 35 U.S.C. 154(b) by 130 days.

(21) Appl. No.: 13/785,173

(22) Filed: Mar. 5, 2013

(65) Prior Publication Data

US 2014/0258564 A1 Sep. 11, 2014

(51) Int. Cl.
| | |
|---|---|
| *G06F 3/00* | (2006.01) |
| *G06F 13/10* | (2006.01) |
| *G06F 9/44* | (2006.01) |
| *G06F 13/38* | (2006.01) |
| *G06F 13/40* | (2006.01) |

(52) U.S. Cl.
CPC ............ *G06F 13/10* (2013.01); *G06F 9/4411* (2013.01); *G06F 13/385* (2013.01); *G06F 13/4068* (2013.01)

(58) Field of Classification Search
None
See application file for complete search history.

(56) References Cited

U.S. PATENT DOCUMENTS

| | | | |
|---|---|---|---|
| 6,272,112 B1 | 8/2001 | Orita | |
| 6,389,064 B1 * | 5/2002 | Dholakia et al. | 375/222 |
| 8,145,328 B2 | 3/2012 | Choudhury et al. | |
| 8,320,344 B2 | 11/2012 | Hodroj et al. | |
| 8,914,878 B2 * | 12/2014 | Burns et al. | 726/22 |
| 2005/0193281 A1 * | 9/2005 | Ide et al. | 714/47 |
| 2007/0109939 A1 * | 5/2007 | Shimizu et al. | 369/59.22 |
| 2007/0162949 A1 * | 7/2007 | Nitta et al. | 725/134 |
| 2009/0060095 A1 * | 3/2009 | Aggarwal et al. | 375/341 |
| 2012/0196644 A1 * | 8/2012 | Scherzer et al. | 455/524 |
| 2012/0317224 A1 | 12/2012 | Caldwell et al. | |
| 2013/0064544 A1 * | 3/2013 | Raponi et al. | 398/58 |
| 2014/0068720 A1 * | 3/2014 | Somers | H04L 63/1441 726/4 |
| 2014/0213294 A1 * | 7/2014 | Marti et al. | 455/456.2 |

* cited by examiner

*Primary Examiner* — Henry Tsai
*Assistant Examiner* — Aurangzeb Hassan
(74) *Attorney, Agent, or Firm* — Shumaker & Sieffert, P.A.

(57) ABSTRACT

Implementations of the present disclosure provide methods and systems for identifying peripheral devices with which problematic connections have been established. According to one embodiment, a method for detecting a model of peripheral device for which problematic connections with a computerized unit are common is disclosed. The method involves receiving values of each of one or more features of a particular connection between a computerized unit and a peripheral device, using the received values to determine a score for each of the features of the particular connection, calculating an overall connection score from the scores for each of the features, and generating a problematic peripheral device report including the model of the peripheral device if the overall connection score is indicative of a problematic connection.

19 Claims, 7 Drawing Sheets

METHODOLOGY FOR DETECTING PROBLEMATIC CONNECTIONS WITH PERIPHERAL DEVICES

BACKGROUND

The ability to wirelessly connect computerized devices to other computerized devices and peripheral devices has dramatically increased the mobility and functionality of computerized equipment. Such wireless technology has allowed users of computerized equipment to freely move such equipment from one location to another while maintaining the same functionality that the equipment would have had if it bad remained stationary at its original location. Furthermore, such wireless technology has allowed users to reap the benefits provided by peripheral devices, such as enhanced functionality of computerized units, without the hassle and clutter of wires or electrical cords. However, because of the vast array of different types of peripheral devices and the equally vast number of producers of such devices, ensuring that all such devices are compatible with all computerized units can be extremely burdensome, if not impossible.

In order to facilitate connectivity between devices built and designed by different companies and manufacturers, standard wireless protocols have been developed that ensure that connections can be established between devices manufactured and built by a variety of producers. However, even devices that use the same standard wireless protocols may sometimes exhibit connectivity problems. Certain models of peripheral devices may not work as well with a particular model of central computerized equipment as other peripheral device models. This may be due to idiosyncrasies in either the hardware or software used to connect the peripheral device to the computerized unit. Such idiosyncrasies can exist at either end of the connection. Developers of computerized units seek to minimize such connection problems by identifying the source of such problems and designing hardware and software that minimize the frequency of such problems. Oftentimes, developers of computerized units identify such connection problems by connecting multiple models of multiple types of peripheral devices and monitoring the performance of the connections.

However, due to the array of different peripheral devices and the large number of producers of any single type of peripheral device, it would be extremely burdensome for a producer of a computerized unit to ensure robust connectivity with all peripheral devices on the market by testing each individual model of peripheral device. Computerized unit producers attempt to develop hardware and software that minimizes potential connectivity problems but fail to cure all such problems as a result of not being able to anticipate every potential connectivity issue. Computerized unit producers may test a variety of peripheral devices and modify the hardware and software used in the computerized unit to eliminate problems that are detected. Nevertheless, some problems may remain and some may even go undiscovered if users fail to report them. Furthermore, due to commonalities in the various peripheral devices that are tested, some of the testing may be redundant.

SUMMARY

Implementations of the present disclosure provide methods and systems for identifying peripheral devices with which problematic connections have been established. Once identified, the identities of such peripheral devices can be reported to an appropriate entity in order that the problems can be investigated and the cause of the problems identified. Thereafter, measures can be taken to remedy the problems. In some implementations of the disclosure, machine learning algorithms that determine common values for features of connections between computerized units and peripheral devices are utilized to determine whether or not one or more values for a particular connection between a computerized unit and a peripheral device fall outside an acceptable range.

According to one embodiment, a method for detecting a problematic connection between a peripheral device and a computerized unit is disclosed, the method comprising receiving values of each of one or more features of a particular connection between a computerized unit and a peripheral device, using the received values to determine a score for each of the features of the particular connection, determining whether the one or more scores are indicative of a problematic connection, and generating a problematic peripheral device report including an identifying descriptor of the peripheral device if the one or more scores are indicative of a problematic connection.

According to another embodiment, a non-transitory computer readable medium for detecting a problematic connection between a peripheral device and a computerized unit is disclosed, the non-transitory computer readable medium having computer executable instructions for receiving values of each of one or more features of a particular connection between a computerized unit and a peripheral device, using the received values to determine a score for each of the features of the particular connection, determining whether the one or more scores are indicative of a problematic connection, and generating a problematic peripheral device report including an identifying descriptor of the peripheral device if the one or more scores are indicative of a problematic connection.

According to an alternative embodiment, a system for detecting a problematic connection between a peripheral device and a computerized unit is disclosed, the system comprising a server configured to receive values of each of one or more features of a particular connection between a computerized unit and a peripheral device, a processor, configured to evaluate one or more probability density functions, each of which corresponds to a feature of the particular connection, at the values of the features of the particular connection and to calculate the product of the probabilities obtained from evaluating the probability density functions, a comparator, configured to compare the product of the probabilities with an error rate, and a database, configured to store the one or more probability density functions and the error rate.

DETAILED DESCRIPTION

Figure 1:
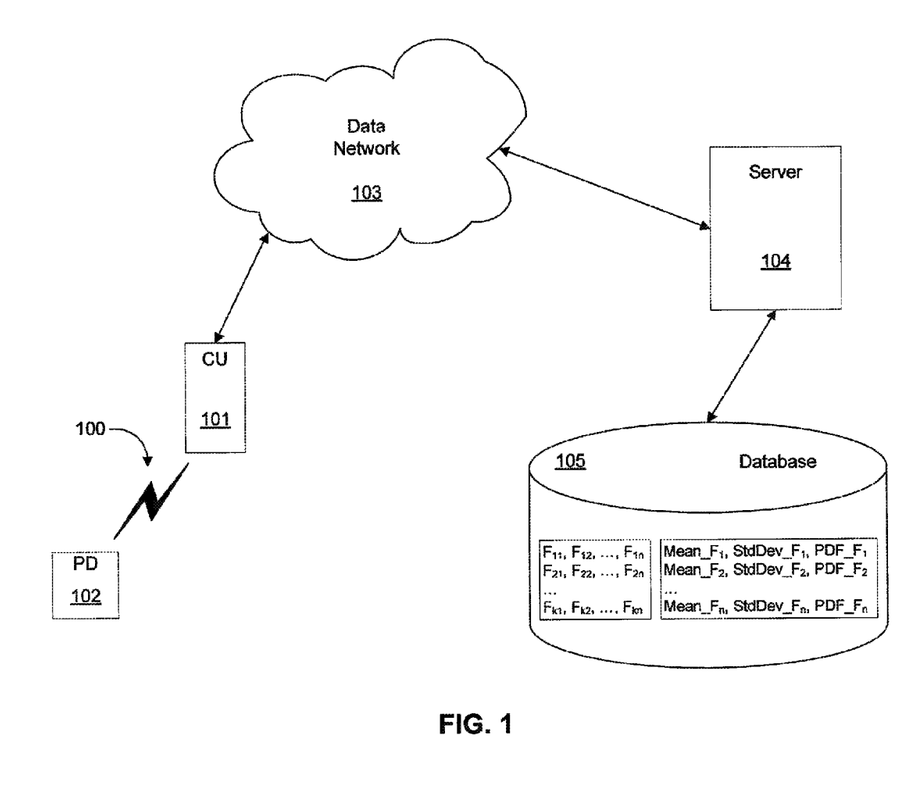
FIG. 1 is a block diagram of an example environment in which the methodology for detecting problematic connections between computerized units and peripheral devices may be implemented.

FIG. 1 is a block diagram of an example communications environment in which various embodiments of the present invention may be implemented. In the environment depicted by 1, a connection 100 is established between a computerized unit (CU) 101 and a peripheral device (PD) 102. The connection may be made through a wireless local area network (WLAN), through a wireless personal area network (WPAN), or through any other type of network. For example, the connection may be a Bluetooth connection, a ZigBee connection, a wireless USB connection, a Z-Wave connection, an IrDA connection, or any other kind of WPAN connection. The CU 101 may be a smart phone, a tablet computer, a laptop computer, a desktop computer, a watch with a computer operating system, a personal digital assistant (PDA), a video game console, or any one of a number of additional devices a user might use. The PD 102 may be a WiFi router, a Bluetooth headset, wireless speakers, a wireless microphone, wireless headphones, a remote control, or any other type of peripheral device that connects to a CU through a network.

The connection 100 between the CU 101 and the PD 102 has numerous features that can be measured in order to provide a quantitative measure of the quality of the connection. Quantitative measures of connection quality allow a threshold quantitative value to serve as the line of demarcation between connections classified as problematic and those classified as non-problematic. Quantitative demarcation prevents the subjectivity inherent in qualitative categorization from injecting uncertainty into the process of determining whether or not a connection is problematic. Features used in determining whether or not a connection is problematic may include hut are not limited to connection time, disconnection time, bandwidth, signal strength, bandwidth per signal strength, the number of channels in the connection, data stalls (i.e. temporary cessation in data transmission), and data threshold. This list of features is not exhaustive, and any other feature that impacts user experience or serves as a proxy for quality of user experience may be used to assess whether or not a connection is problematic.

The example environment also contains a data network 103 that connects the CU 101 to the server 104. Data network 103 may be either a wired or a wireless network. Example networks include but are not limited to an LTE network, a GSM network, a CDMA network, a fiber optic network, and other data networks. The data network 103 allows the CU 101 to communicate with server 104. For example, CU 101 may transmit information to server 104 and receive information from server 104. Data network 103 may include a set of cell towers, as well as a set of base stations and/or mobile switching centers (MSCs). As appreciated by those skilled in the art, the data network may include various cell tower/base station/MSC arrangements. For example, abase station and a cell tower could be co-located at the same site or they could be remotely located, and a single base station could be coupled to various cell towers or various base stations could be coupled to a single MSC, to name but a few of the possible arrangements. Alternatively or in addition to the aforementioned components of data network 103, the data network 103 may include one or more IP multimedia subsystems (IMS), serving gateways (SGW), and evolved node Bs (eNB). One of ordinary skill in the art will recognize that additional components not mentioned herein may be used by data network 103.

Server 104 is connected to CU 101 through data network 103. The connection enables server 104 to both receive data from the CU 101 and transmit data to the CU 101. The server comprises processors and memory configured to receive information from a multitude of CUs, such as CU 101. The information received by server 104 may pertain to connections between the CUs and PDs, such as connection 100. Processors and memory located at the server 104 may further be configured to aggregate information pertaining to a multitude of such connections between CUs and PDs and to store the aggregated information at a database, such as database 105. The server 104 may also calculate certain statistical. characteristics of the aggregated data, such as a mean, a median, a standard deviation, a variance, a probability density function, and a cumulative distribution function for various sets of data within the aggregated data. Server 104 may further comprise processors and memory configured to transmit statistical characteristics of the data and other information to the CU through data network 103.

Server 104 is also connected to database 105. Database 105 stores a variety of information, including, e.g., the information aggregated by server 104 pertaining to a multiplicity of connections between CUs and PDs. For example, database 105 may store sets of data corresponding to certain categories of connections, e.g. connections using a specific type of network or connection type. Categories of connections may also be defined by types of CUs and types of PD. Types of CUs and PDs may be determined by the type of connection utilized by the CU and the PD. For example, Bluetooth connections may represent one category, and WiFi connections may represent another category. Other example categories include connections with headsets or connections with visual displays. Each data set may include data points for a number of different features of connections. For example, data sets may include data points for connection time, disconnection time, bandwidth, signal strength, bandwidth per signal strength, the number of channels in the connection, data stalls, and data threshold. Groups of data points for each unique feature constitute distributions. Database 105 may also store statistical characteristics of each data set, e.g. a mean, a median, a standard deviation, a variance, a probability density function, and a cumulative distribution function for each distribution in the data set.

Embodiments of the present disclosure provide methods and systems by which peripheral devices with which problematic connections are common can be identified. Once identified the identities of such peripheral devices can be reported to an appropriate entity in order that the problems can be investigated and the source identified. Thereafter, measures can be taken to remedy the problems. In some embodiments of the disclosure, machine learning algorithms that determine common values for features of connections between computerized units and peripheral devices are utilized to determine whether or not the values for a particular connection between a computerized unit and a peripheral device fall outside an acceptable range.

In an example embodiment of the present disclosure, connections are established between computerized units and peripheral devices. Connections between such peripheral devices and central units may take a variety of forms. For example, the connections may be made via a wireless local area network (WLAN), a wireless personal area network (WPAN), or any other type of network. For example, the connection may be a WiFi connection, a Bluetooth connection, a ZigBee connection, a wireless USB connection, a Z-Wave connection, or an IrDA connection. CUs may include but are not limited to smart phones, tablet computers, laptop computers, desktop computers, watches with computer operating systems, personal digital assistants (PDA), and video game consoles. Peripheral devices may include but are not limited to routers, headsets, speakers, microphones, headphones, remote controls, mice, and visual displays. In general, peripheral devices may be any device capable of being connected to a CU through a network connection.

Once a connection is established, certain features of the connection can be monitored and the values of those features can be determined. For example, the time required to establish a connection between the computerized unit and the peripheral device may be measured and recorded. Other features of connections that can be monitored and recorded may include but are not limited to disconnection time, bandwidth, signal strength, bandwidth per signal strength, the number of channels in the connection, data stalls, and data threshold. Other features that are indicative of the quality of the user experience or that serve as proxies for quality of user experience may also be measured and recorded. Once the values of the features of the connection are measured and recorded, the values can be transmitted to a server. The server can aggregate such values measured by numerous computerized units and store the aggregation of values at a database.

Once a sufficient number of connections have been established and the values of the features of those connections aggregated by a server and stored on a database, statistical characteristics of the sets of aggregated values can be determined. In one implementation, each feature is treated as a random variable and the recorded values of the features are treated as measurements of that random variable. The recorded values thereby form a distribution for the random variable. Statistical characteristics of each of the distributions, such as the mean, the median, the standard deviation, and the variance, can then be ascertained, and a probability density function can be identified for each distribution. The probability density function thus provides the probability that the feature will take a particular value.

Thereafter, each time a CU establishes a new connection with a PD and measures values for each feature of the connection, the values are transmitted to the server, and the server will add the feature values to the distributions stored on the database. Furthermore, the server may periodically recalculate the statistical characteristics of each distribution and also update the parameters for, and if necessary, the form of the probability density functions for each distribution. Such recalculations may occur each time values for a new connection are recorded, each time values for some given number of new connections are recorded, or after a certain duration of time has passed since the statistical characteristics were last updated. For example, recalculations may occur after values for twenty-five new connections have been received or five days after the last time the last recalculation.

In one embodiment of the disclosure, the distributions of feature values are modeled as Gaussian random variables. In such embodiments, the probability density functions have the form $$P(F_k = x) = \frac{1}{\sqrt{2\pi}\,\sigma_k} \cdot \exp\left(\frac{-(x-\mu_k)^2}{2\sigma_k^2}\right),$$

where $F_k$ denotes a kth feature of a connection, $P(F_k=x)$ denotes the probability that the kth feature takes the value of $\sigma_k$ is the standard deviation of the kth feature, and $\mu_k$ is the mean value of the kth feature.

In other embodiments of the disclosure, each time a connection is established between a peripheral device and a computerized unit, values of features of the connection are measured and the values are used to determine whether or not the connection qualifies as problematic. Such features may include but are not limited to connection time, disconnection time, bandwidth, signal strength, bandwidth per signal strength, the number of channels in the connection, data stalls, and data threshold. Other features that are indicative of the quality of the user experience or that serve as proxies for user experience quality may also be used. The feature values can be recorded by the CU.

Once values for each of the features of a connection have been measured, probability density functions corresponding to each feature are evaluated at the measured value of each of the features. The probability density functions may be stored at a database and transferred by a server to the CU, or alternatively, the PDFs may be stored at the CU. Similarly, the probability density functions may be evaluated by a server or by the CU. After each of the probability density functions has been evaluated, the resulting probabilities are multiplied together. If the product of the probabilities exceeds a particular threshold used to determine whether or not a connection is problematic, then the particular connection from which the values were obtained is classified as not problematic. However, if the product of the probabilities falls below the threshold, then the connection from which the values were obtained is classified as problematic. If the product of the probabilities is equal to the threshold value, the connection can be classified as either problematic or not problematic. The product of the probabilities can be calculated by a server, or the product of the probabilities can be calculated by the CU.

In some implementations, the threshold value may be established during an initial training phase. Such a training phase involves acquiring data from a variety of different connections between CUs and PDs in order to build a distribution with a sufficient number of data points for determining an appropriate threshold value. The appropriate threshold value may be determined based on the percentage of values that fall beyond a particular value or based on a proxy for acceptable user experience. Thereafter, the threshold value may be continually updated as data for more connections are added to the distribution.

In one embodiment of the disclosure, the probability density functions take the form $$P(F_k = x) = \frac{1}{\sqrt{2\pi}\,\sigma_k} \cdot \exp\left(\frac{-(x-\mu_k)^2}{2\sigma_k^2}\right),$$

where $F_k$ denotes a kth feature of the connection, $P(F_k=x)$ denotes the probability that the kth feature takes the value of x, x is the measured value of the kth feature, is the standard deviation of the kth feature, and $\mu_k$ is the mean value of the kth feature. After each of the probability density functions have been evaluated, the product of the probabilities is determined according to the formula $$P^* = \prod_{k=1}^{n} \frac{1}{\sqrt{2\pi}\,\sigma_k} \cdot \exp\left(\frac{-(x_k - \mu_k)^2}{2\sigma_k^2}\right),$$

wherein P* is the product of the probabilities for the connection, n is the number of features for which probabilities were determined, is the standard deviation of the kth feature, $\mu_k$ is the mean value of the kth feature, and $x_k$ is the measured value of the kth feature.

If it is determined that the connection is problematic, the connection can be flagged as problematic and a message can be transmitted to a server. The message may include an identifying descriptor, e.g. a device model, a media access control (MAC) address, an internet protocol (IP) address, etc., of the peripheral device with which a problematic connection was identified, the values of each of the measured features of the connection, the probability that each feature have the measured value, the product of the probabilities, and may also include other information pertaining to the connection between the central unit and the peripheral device.

Figure 2:
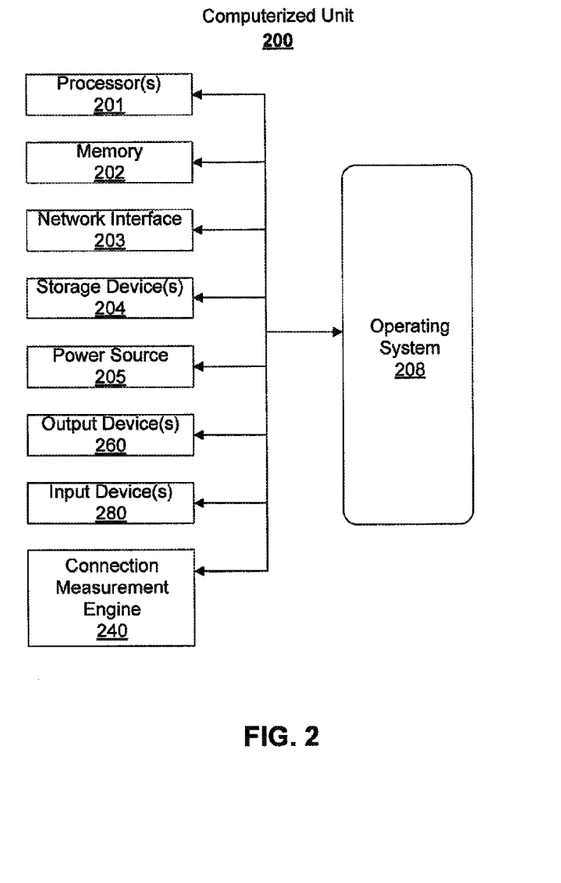
FIG. 2 is a block diagram of basic functional components for one of the computerized units in FIG. 1, according to one aspect of the disclosure.

Turning now to FIG. 2, one particular example of computerized unit (CU) 200 is illustrated. In general, many other embodiments of the CU 200 may be used as long as the embodiment is capable of establishing a connection with a peripheral device (PD). In the illustrated embodiment of FIG. 2, the CU 200 includes one or more processors 201, memory 202, a network interface 203, one or more storage devices 204, a power source 205, one or more output devices 260, and one or more input devices 280. The CU 200 also includes an operating system 208 that is executable by a client and a connection measurement engine 240. In a conventional fashion, each of components 201, 202, 203, 204, 205, 260, 280, 208, and 240 are interconnected physically, communicatively, and/or operatively for inter-component communications.

As illustrated, processors 201 are configured to implement functionality and/or process instructions for execution within CU 200. For example, processors 201 execute instructions stored in memory 202 or instructions stored on storage devices 204. Memory 202, which may be a non-transient, computer-readable storage medium, is configured to store information within CU 200 during operation. In some embodiments, memory 202 includes a temporary memory, i.e. an area for information not to be maintained when the CU 200 is turned off. Examples of such temporary memory include volatile memories such as random access memories (RAM), dynamic random access memories (DRAM), and static random access memories (SRAM). Memory 202 also maintains program instructions for execution by the processors 201.

Storage devices 204 also include one or more non-transient computer-readable storage media. Storage devices 204 are generally configured to store larger amounts of information than memory 202. Storage devices 204 may further be configured for long-term storage of information. In some examples, storage devices 204 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The CU 200 uses network interface 203 to communicate with external devices via one or more networks, such as the data network 103 of FIG. 1 or the network through which connection 100 between CU 101 and PD 102 is established. Such networks may include one or more wireless networks, wired networks, fiber optics networks, and other types of networks through which communication between the CU 200 and an external device may be established. Network interface 203 may be a network interface card, such as an Ethernet card, an optical transceiver, a radio frequency transceiver, or any other type of device that can send and receive information. Other non-limiting examples of network interfaces include Bluetooth®, 3G and WiFi radios in mobile computing devices, and USB. In some embodiments, the CU 200 uses network interface 203 to wirelessly communicate with peripheral devices such as routers, headsets, speakers, microphones, headphones, remote controls, mice, and visual displays.

The CU 200 includes one or more input devices 280. Input devices 280 are configured to receive input from a user through tactile, audio, and/or video feedback. Non-limiting examples of input device 280 include a presence-sensitive screen, a mouse, a keyboard, a voice responsive system, video camera, microphone or any other type of device for detecting a command from a user. In some examples, a presence-sensitive screen includes a touch-sensitive screen.

One or more output devices 260 are also included in CU 200. Output devices 260 are configured to provide output to a user using tactile, audio, and/or video stimuli. Output device 260 may include a display screen (which may be part of a presence-sensitive screen), a sound card, a video graphics adapter card, or any other type of device for converting a signal into an appropriate form understandable to humans or machines. Additional examples of output device 260 include a speaker, a cathode ray tube (CRT) monitor, a liquid crystal display (LCD), or any other type of device that can generate intelligible output to a user.

The CU 200 includes one or more power sources 205 to provide power to the client. Non-limiting examples of power source 205 include single-use power sources, rechargeable power sources, and/or power sources developed from nickel-cadmium, lithium-ion, or other suitable material.

The CU 200 includes an operating system 208 such as the Android® operating system. The operating system 208 controls operations of the components of the CU 200. For example, the operating system 208 facilitates the interaction of connection measurement engine 240 with processors 201, memory 202, network interface 203, storage device(s) 204, input device 280, output device 260, and power source 205.

Connection measurement engine 240 typically includes program instructions and/or data that are executable by the CU 200. In some embodiments, connection measurement engine 240 is a part of operating system 208 executing on the CU 200. Connection measurement engine is configured to determine values of features of connections between the CU 200 and a PD. Such features may include but are not limited to connection time, disconnection time, bandwidth, signal strength, bandwidth per signal strength, the number of channels, data stalls, and data threshold. In some embodiments, connection measurement engine 240 may be a configuration of the processors 201.

Figure 3:
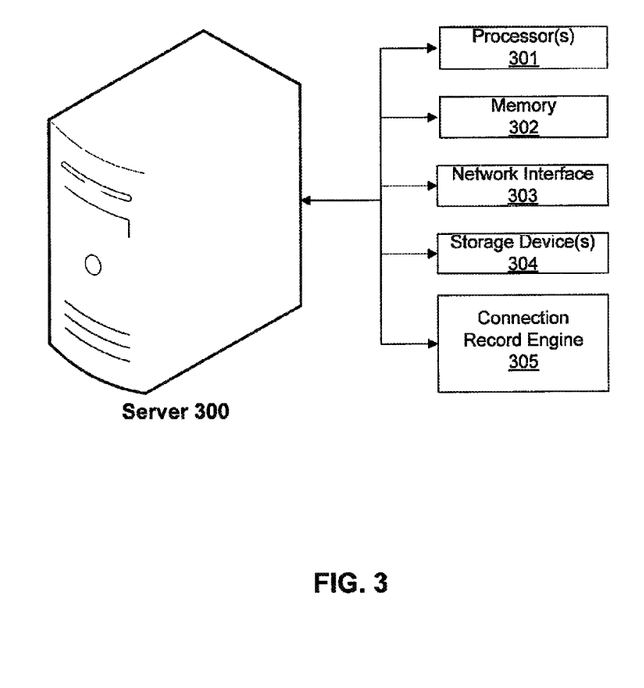
FIG. 3 is a block diagram of basic functional components for a server, according to one aspect of the disclosure.

Moving to FIG. 3, a block diagram of basic functional components for a server 300, according to one aspect of the disclosure, is depicted. The server 300 includes one or more processors 301, memory 302, a network interface 303, one or more storage devices 304, and a connection record engine 305. In a conventional fashion, each of components 301, 302, 303, 304, and 305 are interconnected physically, communicatively, and/or operatively for inter-component communications.

As illustrated, processors 301 are configured to implement functionality and/or process instructions for execution within server 300. For example, processors 301 execute instructions stored in memory 302 or instructions stored on storage devices 304. Memory 302, which may be anontransient, computer-readable storage medium, is configured to store information within server 300 during operation. In some embodiments, memory 302 includes a temporary memory, i.e. an area for information not to be maintained when the server 300 is turned off. Examples of such temporary memory include volatile memories such as random access memories (RAM), dynamic random access memories (DRAM), and static random access memories (SRAM). Memory 302 also maintains program instructions for execution by the processors 301.

Storage devices 304 also include one or more nontransient computer-readable storage media. Storage devices 304 are generally configured to store larger amounts of information than memory 302. Storage devices 304 may further be configured for long-term storage of information. In some examples, storage devices 304 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The server 300 uses network interface 303 to communicate with external devices via one or more networks, such as the data network 103 of FIG. 1. Such networks may include one or more wireless networks, wired networks, fiber optics networks, and other types of networks through which communication between the server 300 and an external device may be established. Network interface 303 may be a network interface card, such as an Ethernet card, an optical transceiver, a radio frequency transceiver, or any other type of device that can send and receive information.

The Connection record engine 305 includes program instructions and/or data that are executable by the server 300. The program instructions and data included in the connection record engine 305 includes instructions to receive and aggregate data received by the server 300 from a computerized unit, such as CU 101, and to store such data at storage devices 304, at memory 302, and/or at an external database, such as database 105. The program instructions and data further include instructions for calculating statistical characteristics of distributions of data points stored at an external database, such as database 105, at storage devices 304 or at memory 302.

Figure 4:
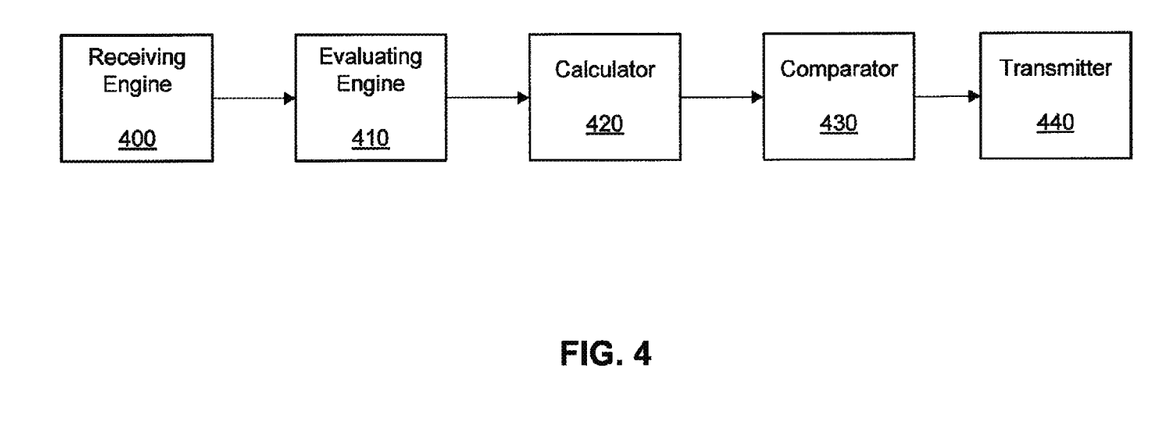
FIG. 4 is a block diagram of the various states of a processor within a computerized unit during the process of detecting a problematic connection with a peripheral device, according to one aspect of the disclosure.

Turning now to FIG. 4, a block diagram of the various time-evolving states of a processor within a computerized unit (CU) during the process of detecting a problematic connection with a peripheral device (PD), according to one aspect of the disclosure, is depicted. At 400, one or more processors of the CU act as a receiving engine. The receiving engine comprises one or more processors that are configured to receive information pertaining to the connection between the CU and a PD. The information received by the receiving engine may include but is not limited to the connection time, disconnection time, bandwidth, signal strength, bandwidth per signal strength, the number of channels for a connection between the CU and the PD, data stalls, and data threshold.

At 410, one or more of the processors of the CU are configured as an evaluation engine. The evaluation engine uses the values for each of the features of the connection between the CU and the PD that were received at 400 in order to evaluate whether the feature value is indicative of a problematic connection. In one implementation, the evaluation engine evaluates a probability density function for each of the measured features at the measured value of each of the features. For example, the evaluation engine may evaluate, when the value of feature is measured to be x, the function $$P(F_k = x) = \frac{1}{\sqrt{2\pi}\,\sigma_k} \cdot \exp\left(\frac{-(x-\mu_k)^2}{2\sigma_k^2}\right),$$

wherein $F_k$ denotes a kth feature of a connection, $P(F_k=x)$ denotes the probability that the kth feature takes the value of x, is the standard deviation of the kth feature, and $\mu_k$ is the mean value of the kth feature.

At 420, one or more of the processors of the CU are configured to function as a calculator. The calculator calculates an overall score for the connection between the GU and the PD based on the values of the features that were received at 400 in order to determine whether or not the connection between the CU and the PD is problematic. In some embodiments, the overall score calculated by the calculator is a product of probabilities, wherein the probabilities are determined by the evaluation engine at 410. In some embodiments, the product of the probabilities is calculated according the formula $$P^* = \prod_{k=1}^{n} \frac{1}{\sqrt{2\pi}\,\sigma_k} \cdot \exp\left(\frac{-(x_k-\mu_k)^2}{2\sigma_k^2}\right),$$

wherein P* is the product of the probabilities for the connection, n is the number of features for which probabilities were determined, is the standard deviation of the kth feature, $\mu_k$ is the mean value of the kth feature, and $x_k$ is the measured value of the kth feature.

At 430, one or more of the processors of the CU are configured as a comparator. The comparator compares the overall score for the connection between the CU and the PD as calculated at 420. In some embodiments, the comparator compares a product of probabilities calculated by the calculator at 420 and determines whether or not the product of probabilities exceeds a threshold value. At 440, one or more of the processors of the CU are configured as a transmitter. If it is determined that the connection between the CU and PD is problematic, the transmitter transmits a message. In some embodiments, the message may be transmitted to server 300. The message may identify the PD and indicate that the connection with the PD is problematic. Identifying the PD may include but is not limited to providing a model number, a model name, a MAC address, an IP address, and providing any other hardware identifier or product identifier. Additional information may be contained in the message including, e.g. the product of probabilities calculated by the calculator at 420 and the values of the features of the connection received at 400.

Figure 5:
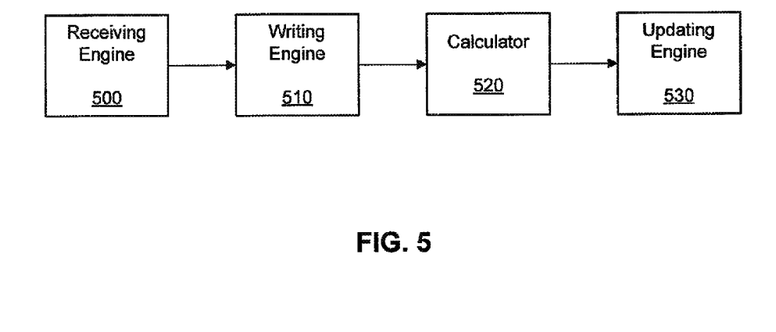
FIG. 5 is a block diagram of the various states of a server during the process of constructing a database with information pertaining to features of connections between peripheral devices and computerized units, according to one aspect of the disclosure.

FIG. 5 is a block diagram of the various states of a server during the process of constructing a database with information pertaining to features of connections between peripheral devices and computerized unit, according to one aspect of the disclosure. At 500, the processors of the server are configured as a receiving engine. The receiving engine receives values of features of a connection between a peripheral device (PD) and a computerized unit (CU). Features may include but are not limited to connection time, disconnection time, bandwidth, signal strength, bandwidth per signal strength, the number of channels in the connection, data stalls, and data threshold. At 510, the processors of the server are configured as a writing engine. The writing engine writes the values of the features of the connection to a database, such as database 105. The database may be a storage device located internally to the server or externally to the server. At 520, one or more of the processors of the server are configured as a calculator. The calculator calculates statistical characteristics of the distribution of values for each of the features stored on the database. Such statistical characteristics include but are not limited to a mean, a median, a standard deviation, a variance, a probability density function, and a cumulative distribution function for each of the distributions. At 530, one or more of the processors of the server are configured as an updating engine. The updating engine is configured to store the updated statistical characteristics calculated at 520. The database may be a storage device located either internal to the server or external to the server.

In some implementations, the process of constructing a database with information pertaining to features of connections between PDs and CUs, of which FIG. 5 provides an example, is used during an initial training phase. Threshold values for features of connections, which are used in identifying problematic routers, are determined during such an initial training phase. The training phase involves acquiring data from a variety of different connections between CUs and PDs in order to build a distribution with a sufficient number of data points for determining an appropriate threshold value. The appropriate threshold value may be determined based on the percentage of values that fall beyond a particular value or based on a proxy for acceptable user experience. Thereafter, the threshold value may be continually updated as data for more connections are added to the distribution.

Figure 6:
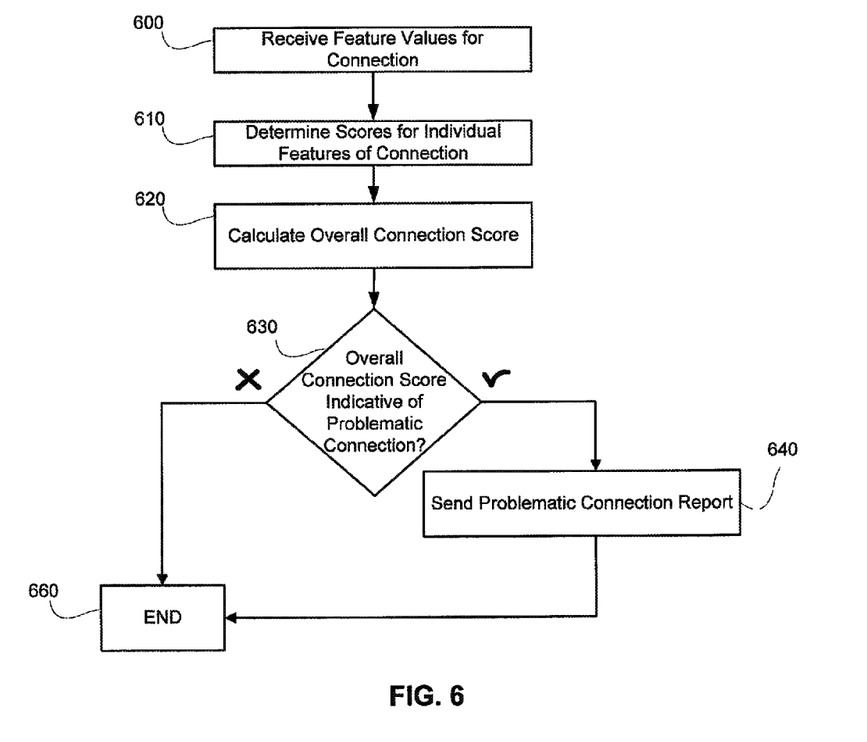
FIG. 6 is a flow diagram illustrating an example method for detecting a problematic connection between a peripheral device and a computerized unit, according to one aspect of the disclosure.

FIG. 6 is a flow diagram illustrating an example method for detecting a problematic connection between a peripheral device (PD) and a computerized unit (CU) according to one aspect of the disclosure. At 600, the values of features of a connection between a PD and a CU are received. The received values may include values for features that include but are not limited to connection time, disconnection time, bandwidth, signal strength, bandwidth per signal strength, the number of channels for the connection, data stalls, and data threshold.

At 610, the values of the features received at 600 are used to determine whether or not the feature values are indicative of a problematic connection. In some embodiments, each of the feature values is used to evaluate a probability density function that corresponds to the feature for which the value was obtained. In some embodiments, the probability density function is $$P(F_k = x) = \frac{1}{\sqrt{2\pi}\,\sigma_k} \cdot \exp\left(\frac{-(x-\mu_k)^2}{2\sigma_k^2}\right),$$

wherein $F_k$ denotes a kth feature of a connection, $P(F_k=x)$ denotes the probability that the kth feature takes the value of x, x is the measured value of the kth feature, is the standard deviation of the kth feature, and $\mu_k$ is the mean value of the kth feature.

At 620, an overall score for the connection between the PD and the CU is calculated based on the feature values that were received at 600. In some embodiments, the overall score for the connection is a product of probabilities, wherein the probabilities are determined by evaluating probability density functions at 610. The product of the probabilities may be calculated according the formula $$P^* = \prod_{k=1}^{n} \frac{1}{\sqrt{2\pi}\,\sigma_k} \cdot \exp\left(\frac{-(x_k-\mu_k)^2}{2\sigma_k^2}\right),$$

wherein $P^*$ is the product of the probabilities for the connection, n is the number of features for which probabilities were determined, is the standard deviation of the kth feature, $\mu_k$ is the mean value of the kth feature, and $x_k$ is the measured value of the kth feature.

At 630, it is determined whether or not the overall score for the connection between the PD and the CU is indicative of a problematic connection. In some embodiments, the overall score is compared with a threshold score in order to determine whether the connection will be classified as problematic. In some embodiments, the overall score is a product of probabilities as determined at 620. At 640, if the overall score for the connection between the PD and the CU classifies the connection as problematic, then the PD is flagged as problematic and a message is transmitted. In one implementation, the message may be transmitted to a server, such as server 300.

Figure 7:
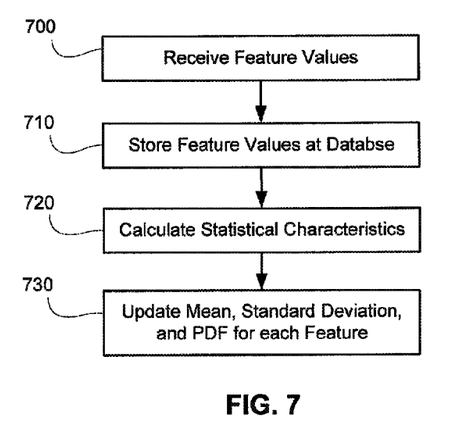
FIG. 7 is a flow diagram illustrating an example method for constructing a database with information pertaining to features of connections between peripheral devices and computerized units, according to one aspect of the disclosure.

FIG. 7 is a flow diagram illustrating an example method for constructing a database with information pertaining to features of connections between peripheral devices (PD) and computerized units (CU), according to one aspect of the disclosure. At 700, values for features of a connection between a PD and a CU are received. The received values may include values for features that include but are not limited to connection time, disconnection time, bandwidth, signal strength, bandwidth per signal strength, the number of channels for the connection, data stalls, and data threshold.

At 710, the feature values are stored at a database, such as database 105. At 720, statistical characteristics of the distributions of values for each of the features stored on the database are calculated. Such statistical characteristics include but are not limited to a mean, a median, a standard deviation, a variance, a probability density function, and a cumulative density function for each distribution. At 730, the updated statistical characteristics calculated at 720 for the distributions that include the feature values added at 710 are stored at the database:

In some implementations, the method for constructing a database with information pertaining to features of connections between PDs and CUs, of which FIG. 7 provides an example, is used during an initial training phase. Threshold values for features of connections, which are used in identifying problematic routers, are determined during such an initial training phase. The training phase involves acquiring data from a variety of different connections between CUs and PDs in order to build a distribution with a sufficient number of data points for determining an appropriate threshold value. The appropriate threshold value may be determined based on the percentage of values that fall beyond a particular value or based on a proxy for acceptable user experience. Thereafter, the threshold value may be continually updated as data for more connections are added to the distribution.

In the example embodiments, the various applications can be configured on any distributed or embedded platform within a single physical location or multiple locations. Similarly, some of the resources may reside on individual and separate platforms or they may be embedded into the server or other platforms. As such, embodiments contemplate that applications, resources, managers, servers, etc. may be joined or separated without diverging from their identities and functions. For example, a "server system" may include a single server platform or multiple server platforms.

All references, including publications, patent applications, and patents, cited herein are hereby incorporated by reference to the same extent as if each reference were individually and specifically indicated to be incorporated by reference and were set forth in its entirety herein.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to retrieve content (i.e., recorded voicemails) from a content server (i.e., a voicemail server). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as, for example, to a city, ZIP code, or state level), so that a particular location of a user cannot be determined. Thus, the user may have control over how information is collected about him or her and used by the systems discussed herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

Variations of the embodiments disclosed herein may become apparent to those of ordinary skill in the art upon reading the foregoing description. Skilled artisans may employ such variations as appropriate, and the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method comprising:
    establishing a data connection between a computerized unit and a server device through a data network;
    receiving, by the server device from the computerized unit, values of each of one or more features of a particular connection between the computerized unit and a peripheral device;
    determining, by the server device and based on the values of each of the one or more features of the particular connection, a respective score for each of the one or more features of the particular connection;
    comparing, by the server device, the respective score for each of the one or more features to a probability density function for a corresponding feature from the one or more features;
    determining, by the server device and based at least in part on the comparison, whether the particular connection between the computerized unit and the peripheral device is problematic;
    responsive to determining that the particular connection is problematic, generating, by the server device, a problematic peripheral device report including a descriptor of the peripheral device; and
    sending, by the server, the problematic peripheral device report.

2. The method of claim 1, further comprising:
    determining, based on the comparison of the respective score of each of the one or more features to a probability density function for the corresponding feature, a respective probability for each of the one or more features; and
    calculating a product of the respective probabilities for the one or more features;
    wherein determining whether the particular connection is problematic is based at least in part on a comparison of the product of the respective probabilities to an error rate.

3. The method of claim 2, the method further comprising:
    determining one or more probability density functions from distributions of values of each of the one or more features of one or more connections between one or more computerized units and one or more peripheral devices, wherein the particular connection between the computerized unit and the peripheral device is one of the one or more connections between the one or more computerized unit and the one or more peripheral devices.

4. The method of claim 3, wherein:
    the distributions of the values of each of the one or more features are constructed by receiving, from the one or more computerized units, values of the one or more features of the one or more connections between the one or more computerized units and the one or more peripheral devices; and storing the values received from the one or more computerized units at a database.

5. The method of claim 1, wherein the one or more features of the particular connection between the computerized unit and the peripheral device include one or more of: a connection time, a disconnection time, bandwidth, a signal strength, bandwidth per signal strength, a number of channels for the particular connection, data stalls, or a data threshold.

6. The method of claim 1, wherein the particular connection between the computerized unit and the peripheral device includes one of: a wireless local area network connection, or a wireless personal area network connection.

7. The method of claim 6, wherein the wireless personal area network connection is one of a Bluetooth connection, a ZigBee connection, a wireless universal serial bus connection, a Z-Wave connection, or an Infrared Data Association connection.

8. The method of claim 1, wherein:

determining the respective score for each of the one or more features of the particular connection comprises evaluating one or more probability density functions, each of which corresponds to one of the one or more features of the particular connection, at the values of each of the one or more features of the particular connection;

determining whether the particular connection is problematic comprises:
  calculating a product of probabilities obtained from evaluating the probability density functions; and
  comparing the product of the probabilities to an error rate;

the probability density functions are equal to:

$$P(F_k = x) = \frac{1}{\sqrt{2\pi}\,\sigma_k} \cdot \exp\left(\frac{-(x-\mu_k)^2}{2\sigma_k^2}\right); \text{ and}$$

$F_k$ denotes the kth feature, $P(F_k=x)$ denotes the probability that the kth feature takes the value of x, is the standard deviation of the kth feature, and $\mu_k$ is the mean value of the kth feature.

9. The method of claim 1, wherein:

determining the respective score for each of the one or more features of the particular connection comprises evaluating one or more probability density functions, each of which corresponds to one of the one or more features of the particular connection, at the values of each of the one or more features of the particular connection;

determining whether the particular connection is problematic comprises:
  calculating a product of probabilities obtained from evaluating the probability density functions; and
  comparing the product of the probabilities to an error rate;

the product of the probabilities is computed according to the formula:

$$P^* = \prod_{k=1}^{n} \frac{1}{\sqrt{2\pi}\,\sigma_k} \cdot \exp\left(\frac{-(x_k-\mu_k)^2}{2\sigma_k^2}\right); \text{ and}$$

P* the probability product for the connection and n is the number of features.

10. A non-transitory computer readable medium storing instructions that, when executed by a processor, cause a server device to:

establish a data network connection between a computerized unit and the server device over a data network;

receive, from the computerized unit, values of each of one or more features of a particular connection between the computerized unit and a peripheral device;

determine, based on the values of each of the one or more features of the particular connection, a respective score for each of the one or more features of the particular connection;

compare the respective score for each of the one or more features to a probability density function for the corresponding feature;

determining, based at least in part on the comparison, whether the particular connection between the computerized unit and the peripheral device is problematic;

responsive to determining that the particular connection is problematic, generate a problematic peripheral device report including a descriptor of the peripheral device; and send the problematic peripheral device report.

11. The non-transitory computer readable medium of claim 10, wherein the instructions further cause the server device to:

determine, based on the comparison of the respective score of each of the one or more features to a probability density function for the corresponding feature, a respective probability for each of the one or more features;

calculate a product of the respective probabilities for the one or more features; and compare the product of the respective probabilities to an error rate to determine whether the particular connection is problematic.

12. The non-transitory computer readable medium of claim 11, wherein the instructions further cause the server device to:

determine one or more probability density functions from distributions of values of each of the one or more features of one or more connections between one or more computerized units and one or more peripheral devices, wherein the particular connection between the computerized unit and the peripheral device is one of the one or more connections between the one or more computerized unit and the one or more peripheral devices.

13. The non-transitory computer readable medium of claim 12, wherein:

the distributions of the values of each of the one or more features are constructed by receiving, from the one or more computerized units, values of the one or more features of the one or more connections between the one or more computerized units and the one or more peripheral devices; and storing the values received from the one or more computerized units at a database.

14. The non-transitory computer readable medium of claim 10, wherein the one or more features of the particular connection between the computerized unit and the peripheral device include one or more of: connection time, disconnection time, bandwidth, signal strength, bandwidth per signal strength, a number of channels for the particular connection, data stalls, or a data threshold.

15. The non-transitory computer readable medium of claim 10, wherein the particular connection between the computerized unit and the peripheral device includes one of: a wireless local area network connection, or a wireless personal area network connection.

16. The non-transitory computer readable medium of claim 15, wherein the wireless personal area network connection is one of a Bluetooth connection, a ZigBee connection, a wireless universal serial bus connection, a Z-Wave connection, or an Infrared Data Association connection.

17. The non-transitory computer readable medium of claim 10, wherein the instructions further cause the server device to:

evaluate one or more probability density functions, each of which corresponds to a feature of the connection, at the values of the features of the particular connection;

calculate the product of the probabilities obtained from evaluating the probability density functions; and compare the product of the probabilities to an error rate, wherein the probability density functions are equal to:

$$P(F_k = x) = \frac{1}{\sqrt{2\pi}\,\sigma_k} \cdot \exp\left(\frac{-(x-\mu_k)^2}{2\sigma_k^2}\right);$$

wherein $F_k$ denotes the kth feature, $P(F_k=x)$ denotes the probability that the kth feature takes the value of x, $\sigma_k$ is the standard deviation of the kth feature, and $\mu_k$ is the mean value of the kth feature.

18. The non-transitory computer readable medium of claim 10, wherein the instructions further cause the server device to:

evaluate one or more probability density functions, each of which corresponds to a feature of the connection, at the values of the features of the particular connection;

calculate the product of the probabilities obtained from evaluating the probability density functions; and compare the product of the probabilities to an error rate; wherein the product of the probabilities is computed according to the formula:

$$P^* = \prod_{k=1}^{n} \frac{1}{\sqrt{2\pi}\,\sigma_k} \cdot \exp\left(\frac{-(x_k-\mu_k)^2}{2\sigma_k^2}\right);$$

wherein $P^*$ is the probability product for the connection and n is the number of features.

19. A device comprising:

a processor; and a memory storing instructions that, when executed by the processor, cause the processor to:

receive, from a computerized unit over a network connection between the device and the computerized unit, values of each of one or more features of a particular connection between the computerized unit and a peripheral device;

determine, based the values of each of the one or more features of the particular connection, a respective score for each of the one or more features of the particular connection;

compare the respective score for each of the one or more features to a probability density function for the corresponding feature;

determine, based at least in part on the comparison, whether the particular connection between the computerized unit and the peripheral device is problematic;

responsive to determining that the particular connection is problematic, generate an error report including a descriptor of the peripheral device; and send the problematic peripheral device report.

* * * * *